3,255,164
REDOX POLYMERIZATION INCORPORATING STEP OF DISSOLVING REDUCING AGENT IN MONOMER
Robert L. Visger, Berea, Ohio, and Harold G. Hahn, Midland, Mich., assignors to The Dow Chemical Company, Midland, Mich., a corporation of Delaware
No Drawing. Filed May 25, 1961, Ser. No. 112,516
5 Claims. (Cl. 260—86.3)

This invention relates to a process for polymerizing in aqueous emulsion one or a mixture of monoethylenically unsaturated substantially water-immiscible polymerizable monomeric vinylidene compounds, such as vinylidene chloride, styrene, vinyl chloride, acrylate esters, acrylonitrile and the like. More specifically it relates to such polymerization processes utilizing redox polymerization catalysts.

It is known that polymerization of various vinylidene compounds may be accelerated or promoted by the presence of a peroxide or oxygen-yielding material in combination with a reducing agent forming a redox system with or without an activating heavy metal salt. The prior art processes incorporated redox catalysts in the aqueous system at the start of the polymerization or added catalyst continuously over the polymerization period. The former technique frequently causes an over-active catalyst system having a very short life which results in depletion of the catalyst before polymerization has proceeded to a substantial extent. The latter procedure is unsatisfactory because the optimum rate of addition of the catalyst is generally unknown and the polymers resulting therefrom are not uniform as to molecular weight and consistency. As is known, addition polymerization is exothermic and for polymerization to proceed smoothly it is required that the heat of polymerization be removed. When, because of an excess of catalyst or for other reason, polymerization proceeds more rapidly than the heat can be dissipated, this compounds the difficulty. As a consequence, when the catalyst concentration in an addition polymerization is varied for any reason, the polymerization frequently is difficult to control.

It has now been discovered that the redox catalyst may be made available only as it is required in the polymerization by including a peroxygen compound in the aqueous charge, dissolving the reducing agent, sulfur dioxide, in the monomer, and then adding the resulting solution to the aqueous medium at a rate corresponding to the polymerization rate. Thus the amount of reducing agent in the system may be automatically regulated in relation to the concentration of monomer present in the polymerization charge.

The sulfur dioxide, preferably liquefied, is dissolved in the monomer to be polymerized or mixture of monomers to be copolymerized. Such monomers include, in addition to those noted above, vinyl chloride-vinylidene chloride mixtures, vinylidene chloride-alkyl acrylate ester mixtures, vinylidene chloride-acrylonitrile mixtures, as well as ternary monomer mixtures. The concentration of sulfur dioxide depends, of course, on the total peroxygen compound available and necessary in the aqueous charge but generally is in the range of 0.01 to 1 percent by weight.

The aqueous medium delivered to the polymerization vessel preferably contains an emulsifying or dispersing agent, which may be anionic or nonionic in nature. Suitable emulsifiers include sulfonates, soaps, fatty sulfate esters, ethylene oxide condensates of fatty alcohols and the like as is well known in emulsion polymerization techniques. The content is generally in the range of 0.01 to 5 percent by weight.

The aqueous charge also contains the peroxygen compound. Suitable compounds include potassium or ammonium persulfate, lauroyl peroxide, benzoyl peroxide, cumene hydroperoxide or other peroxygen compounds as is well known in the art. The concentration depends on the amount of monomer to be added in the total charge and the optimum catalyst concentration required for the particular monomer and generally is in the range of about 0.1 to 2 percent by weight of the aqueous charge. The amount of peroxygen compound and of total sulfur dioxide in the charge should be substantially stoichiometrically equivalent.

The aqueous charge may also include a heavy metal ion activator such as ferric chloride or ferrous sulfate as is known in the art. Electrolytes, such as potassium chloride, trisodium phosphate or other salt having no deleterious effect on the system may also be present in the aqueous phase, as may be polymer modifiers or chain transfer agents such as mercaptans and the like.

In the practice of the invention, the aqueous phase, containing the peroxygen compound and desirable dispersing agents, modifiers, etc., is charged to the polymerization vessel maintained at the desired polymerization temperature at between 20° to about 80° C. The monomer containing dissolved sulfur dioxide is fed to the vessel, with agitation, at a rate not substantially greater than that at which the monomer is converted to polymer and preferably at about the same rate at which the monomer is converted to polymer. The invention may also be carried out in a continuous polymerization system wherein separate streams of the aqueous medium and monomer-sulfur dioxide solution are fed into admixture in a reaction zone maintained under polymerizing conditions.

The operation and advantages of this invention will be more apparent from the following illustrative examples, in which all parts and percentages are by weight.

*Example I*

A mixture of 560 parts of ethyl acrylate monomer and 240 parts of vinylidene chloride monomer was prepared and 4 parts of liquid sulfur dioxide were dissolved therein.

An aqueous charge having the following composition was placed in a polymerization vessel maintained at 43° C.:

Water, parts _____ 800
Potassium persulfate, parts _____ 4
Sodium dodecyl benzene sulfonate, parts _____ 1.6
Ferric chloride, p.p.m. _____ 0.25
pH _____ 3.9

The monomer-sulfur dioxide solution was fed into the aqueous charge continuously over a period of four hours. The final pH was 2.0. The resulting polymerized latex was homogeneous.

*Example II*

Liquid sulfur dioxide (0.125 part) was dissolved in 47.6 parts of monomeric vinyl chloride.

The aqueous phase had the following composition:

|  | Parts |
|---|---|
| Water | 94 |
| Sodium salt of sulfonated white oil | 2 |
| Ammonium perdisulfate | 0.25 |
| Sulfuric acid, to pH 2.1. | |

The vinyl chloride-sulfur dioxide solution was fed into the aqueous phase in a vessel continuously swept with nitrogen and maintained at 40° C. for a period of two hours. The latex was coagulated with alum and the polymer recovered.

Example III

A mixture composed of 25 parts acrylonitrile and 25 parts of ethyl acrylate was prepared and 0.15 part of liquid sulfur dioxide was dissolved therein.

An aqueous charge having the following composition was placed in a polymerizing vessel:

| | Parts |
|---|---|
| Water | 195 |
| Sodium salt of isopropyl naphthalene sulfonic acid | 4 |
| Ammonium persulfate | 0.5 |

The monomer solution was added continuously to the aqueous charge maintained at 40° C. over a period of five hours while flushing the vessel with nitrogen. The latex was coagulated with alum and the copolymer recovered.

Example IV

To a monomer mixture of 90 parts of vinyl chloride and 10 parts of diethyl maleate was added 0.02 part liquid sulfur dioxide.

The aqueous phase had the following composition:

| | Parts |
|---|---|
| Water | 125 |
| Potassium persulfate | 0.01 |
| Potassium oleate | 2 |

The aqueous phase was placed in a vessel maintained at 40° C. and the monomer solution added continuously with agitation over a period of six hours. The latex was coagulated with alum and the copolymer recovered.

Example V

A monomeric mixture consisting of 88 percent vinyl chloride and 12 percent methyl acrylate was polymerized in aqueous medium using a potassium persulfate sulfur dioxide redox catalyst system. When the sulfur dioxide was dissolved in the monomers and the monomers added at the rate at which polymerization was occurring (thus, in accordance with this invention), the polymerization was readily controlled and the resulting latex had little or no precoagulum.

In contrast, when when all of the catalyst was introduced into the polymerization charge initially and the latex caused to polymerize, the polymerization was difficultly controllable because of an erratic polymerization rate and much precoagulum was evidenced.

We claim:

1. In a process for the polymerization of monomeric vinylidene compounds in aqueous emulsion utilizing a redox polymerization catalyst comprising sulfur dioxide and a peroxygen compound, the improvement comprising dissolving sulfur dioxide in the monomer to be polymerized and adding the resulting solution to an aqueous medium containing a peroxygen compound under polymerizing conditions, said solution added at a rate which is substantially equal to the rate at which the monomer is polymerized.

2. The process claimed in claim 1 wherein the peroxygen compound is potassium persulfate.

3. The process claimed in claim 1 wherein said aqueous medium contains an emulsifying agent.

4. The process claimed in claim 1 wherein the vinylidene compound is vinyl chloride.

5. The process claimed in claim 1 wherein the vinylidene compound is a mixture of vinylidene chloride and ethyl acrylate.

References Cited by the Examiner

UNITED STATES PATENTS

| | | | |
|---|---|---|---|
| 2,356,925 | 8/1944 | Fryling | 260—86.3 |
| 2,436,926 | 3/1948 | Jacobson | 260—85.5 |
| 2,462,422 | 2/1949 | Plambeck | 260—92.8 |
| 2,689,242 | 9/1954 | Lucht | 260—92.8 |
| 2,976,270 | 3/1961 | Malin | 260—92.8 |

JOSEPH L. SCHOFER, *Primary Examiner.*

PHILIP E. MANGAN, DONALD E. CZAJA, *Examiners.*

H. WONG, *Assistant Examiner.*